United States Patent
Scott et al.

(10) Patent No.: US 8,816,933 B2
(45) Date of Patent: Aug. 26, 2014

(54) DIRECTIONAL DIVERSITY RECEIVE SYSTEM

(75) Inventors: Julian Scott, Glendale, CA (US); Jeff Hopkins, Valencia, CA (US); Chris Noski, Valencia, CA (US)

(73) Assignee: Troll Systems Corporation, Valencia, CA (US)

( * ) Notice: Subject to any disclaimer, the term of this patent is extended or adjusted under 35 U.S.C. 154(b) by 1255 days.

(21) Appl. No.: 12/605,279

(22) Filed: Oct. 23, 2009

(65) Prior Publication Data

US 2010/0104054 A1 Apr. 29, 2010

Related U.S. Application Data

(60) Provisional application No. 61/107,821, filed on Oct. 23, 2008.

(51) Int. Cl.
| | |
|---|---|
| *H01Q 1/12* | (2006.01) |
| *H01Q 3/00* | (2006.01) |
| *H01Q 21/00* | (2006.01) |
| *H01Q 3/02* | (2006.01) |

(52) U.S. Cl.
CPC .............. *H01Q 1/1257* (2013.01); *H01Q 3/02* (2013.01); *H01Q 21/00* (2013.01)
USPC ............................ 343/879; 343/757; 343/725

(58) Field of Classification Search
CPC ....... H01Q 1/12; H01Q 1/125; H01Q 1/1257; H01Q 21/00; H01Q 21/20; H01Q 3/00; H01Q 3/02
USPC ......... 343/725, 757, 761, 777, 878, 879, 893; 455/272; 375/347
See application file for complete search history.

(56) References Cited

U.S. PATENT DOCUMENTS

| | | | | | |
|---|---|---|---|---|---|
| 2,095,588 | A | * | 10/1937 | Bellini | 342/420 |
| 2,928,087 | A | * | 3/1960 | Parker | 342/399 |
| 3,058,107 | A | * | 10/1962 | Danielson | 342/374 |
| 5,870,681 | A | * | 2/1999 | Myer | 455/562.1 |
| 6,212,407 | B1 | * | 4/2001 | Hiramatsu | 455/562.1 |
| 6,433,742 | B1 | * | 8/2002 | Crawford | 343/700 MS |
| 7,450,082 | B1 | * | 11/2008 | Lopez | 343/850 |
| 7,990,332 | B1 | * | 8/2011 | Tischer | 343/810 |
| 8,144,067 | B2 | * | 3/2012 | Vogler | 343/757 |
| 2002/0024468 | A1 | * | 2/2002 | Palmer et al. | 343/702 |
| 2003/0211831 | A1 | * | 11/2003 | Xu et al. | 455/63.3 |
| 2004/0183737 | A1 | * | 9/2004 | Lindenmeier | 343/725 |
| 2009/0054106 | A1 | * | 2/2009 | Antolovic et al. | 455/562.1 |

OTHER PUBLICATIONS

Declaration of Julian Scott. Feb. 9, 2011.
BMS. Highlights on IBC 2008. Netherlands, Amsterdam. 2008. http://www.bmssaleseurope.com/index.php?id=139&tx_ttnews[pointer]=2&tx_ttnews[tt_news]=130&tx_ttnews[backPid]=138&cHash=16e3f651c8.

(Continued)

*Primary Examiner* — Dameon E Levi
*Assistant Examiner* — Jennifer F Hu
(74) *Attorney, Agent, or Firm* — EIP US LLP

(57) ABSTRACT

Embodiments disclosed herein relate to a directional diversity receive system. The system may comprise a plurality of antennas attached to and fixed with respect to a frame. The system may further comprise a steerable antenna attached to and moveable with respect to the frame. The system may be encapsulated by a cover and may be configured for relocation as an integrated module.

28 Claims, 14 Drawing Sheets

(56) References Cited

OTHER PUBLICATIONS

Broadcast Engineering. BMS-Europe features CT2020HD COFDM camera transmitter. Sep. 11, 2008. http://broadcastengineering.com/products/bms-europe-features-cofdm-camera-transmitter-0911/index.html.

Broadcast Microwave Services, Inc. BMS: Productsearch. Accessed Nov. 5, 2008. http://broadcast-microwave-services.com/index.php?id=productsearchsecurity&product=173.

Broadcast Microwave Services, Inc. VLAxx15LP Data sheet. Apr. 2009. Retrieved from http://broadcast-microwave-services.com/fileadmin/user_upload/files/E_VLAxx15LP_Six_Way_V1_bc.pdf.

Siatchoua, et al. An inexpensive electronically steerable antenna for mobile applications in L-band. 24th AIAA International Communications Satellite Systems Conference (ICSSC) and 4t, Jun. 11-14, 2006, San Diego, California. Page 1.

Toshiba Europe GmbH. Toshiba Easy Guard Carefree Mobile Computing. Tech Insight: Diversity Antenna. 2005.

Troll Systems Corporation. Company News, Jun. 2006 to Apr. 2009. http://www.trollsysterns.com/company_news.htm.

Troll Systems Corporation. Ground-Based Products brochure. XNG™ A600 Directional Diversity HD/SD Receive System. Approximately Sep. 4, 2008.

Troll Systems Corporation. Directional Diversity Microwave DVB-T six channel receive site system—XNG wins two engineering awards, NAB 2008. Apr. 5, 2009. http://www.trollsystems.com/.

Troll Systems Corporation. Video Downlinks, and Directional Diversity Ground Receive System Captures HD Video of the Berlin Air Show, Troll and Axsys Provide HD Video Above Berlin. Oct. 1, 2009. http://www.trollsystems.com/company_news_Berlin.htm.

Troll Systems Diversity Antenna. Oct. 1, 2009. Directional Diversity Video Receive System and HD Video Downlink products from Troll Systems Win TV Technology Star Award and Broadcast Engineering Award at NAB 2008. http://www.trollsystems.com/company_news_Diversity%20Antenna.htm.

* cited by examiner

DIRECTIONAL DIVERSITY RECEIVE SYSTEM

CROSS REFERENCE TO RELATED APPLICATIONS

This application claims the benefit of U.S. Provisional Application No. 61/107,821, which was filed Oct. 23, 2008, and is entitled "MULTI-COMPONENT, MULTI-DIRECTIONAL ANTENNA." The entire disclosure of this provisional application is hereby incorporated by reference in its entirety.

BACKGROUND

1. Field of the Invention

Embodiments disclosed herein relate to wireless transmit and receive systems. More specifically, embodiments herein may relate to a directional diversity receive system.

2. Description of the Related Art

A traditional radio frequency (RF) link consists of both a transmit and receive system. Such RF link may use the digital COFDM (Coded Orthogonal Frequency Division Multiplexing) modulation/demodulation schemes to transmit and/or receive audio, encapsulated data, compressed video, or other information or data. The transmit system takes the information and converts it into a modulated RF signal using a transmitter and radiates that energy into the air via an antenna. The receive system uses an antenna to collect the RF energy and feed it to a receiver which then demodulates the signal back into the original information.

Between the output of the transmit antenna and the input of the receive antenna, the RF signal propagates through the air getting attenuated and bounced off terrain, buildings, or water. As received at the receive antenna, the signal typically should have enough power (from the transmitter) and gain (from the receive antenna) to overcome the attenuation due to the air and to satisfy the threshold signal level required by the receiver. Attenuation due to the air is dependent on a number of factors, such as distance traveled, frequency of the signal (higher frequency signals generally get attenuated more), and atmospheric conditions (hot/cold and dry/wet air may all affect the attenuation). The attenuation can be roughly calculated, but greater attenuation called fading may occur under certain conditions. Such greater attenuation must be accounted for when designing receive systems.

In addition, the receive system may also receive none, some, or all of the bounced signals, which is known as natural multi-path. This natural multi-path presents multiple images of the same signal at the receiver due to paths having varied lengths which are taken by the bounced signals to get from the transmit antenna to the receive antenna. In addition, the system may receive other transmitted signals of the same, or similar, frequency and power levels, known as unnatural multi-path. To receive a desired signal, the system can preferably discriminate against and overcome both forms of multi-path to demodulate the desired signal.

Problems further to those described above may also be experienced when receiving a signal. For example, too much received signal, be it a desired signal or signal from natural and/or unnatural multi-path, can be a problem due to an input amplifier of the receiver being driven into a non-linear region and causing unrecoverable distortions of the desired signal.

A need exists for improved wireless communication systems and methods, for example for use with the transmission and reception of RF signals. More specifically, a need exists for improved receive systems and methods of controlling those receive systems.

DETAILED DESCRIPTION

Figure 1:
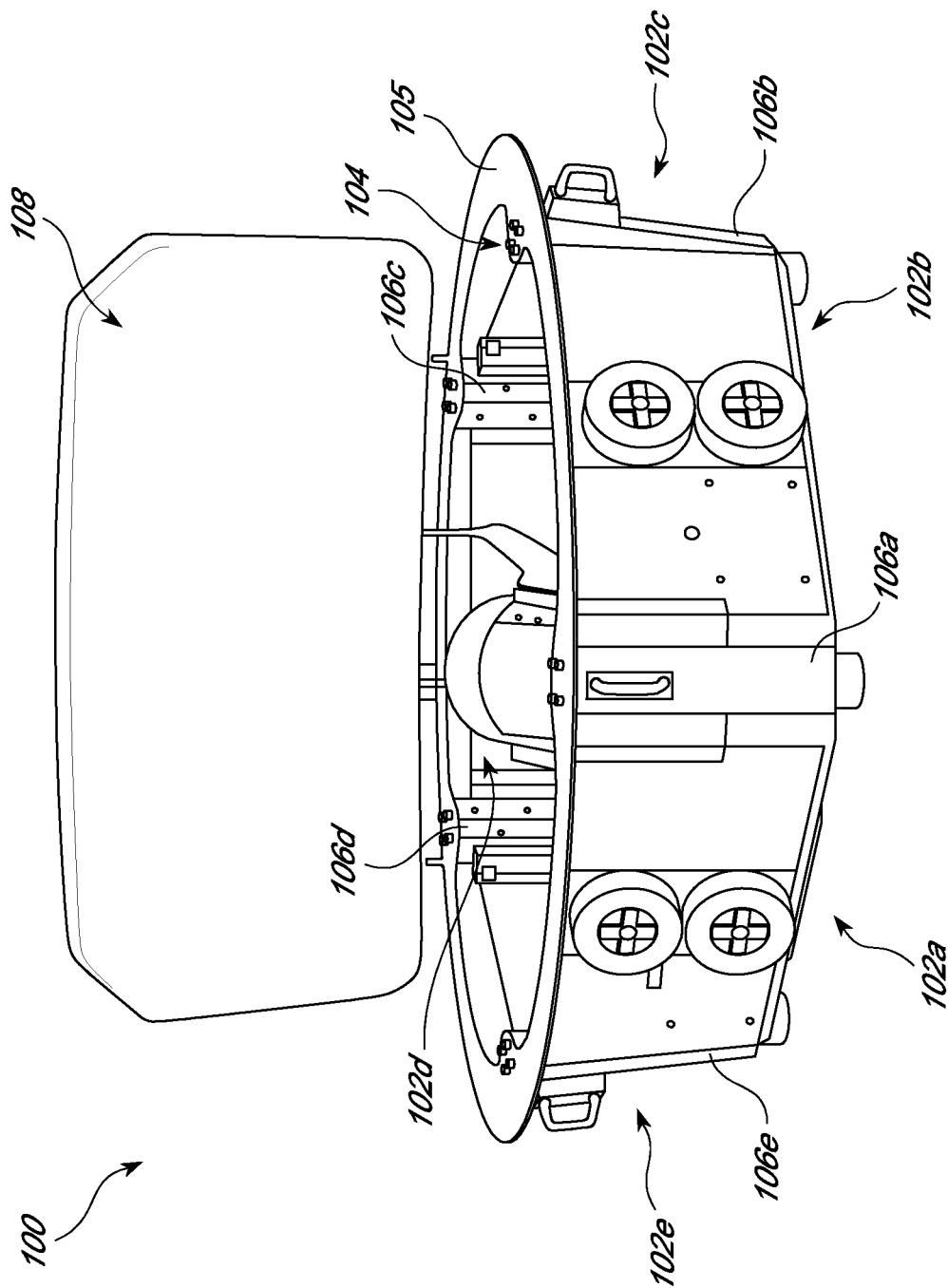
FIG. 1 is a front view of an embodiment of a directional diversity receive system.

Depending on the application, one of several types of antennas can be utilized to implement a wireless communication system. For example, types of antennas that may be used are omni, sector, and directional antennas. Those skilled in the art will understand that an omni antenna may radiate energy, for example RF energy, approximately in and receive energy approximately from all directions, i.e. in a 360 degree azimuth. Those skilled in the art will also understand that a sector antenna may radiate or receive a cone of energy that is generally between approximately 50 and approximately 120 degrees, and a directional antenna may radiate or receive a beam of energy generally in one or more determined directions with respect to the antenna. Directional antennas may have an angle (beam-width) of signal reception or transmission that is less than that of a sector antenna, which angle may be determined by the specific configuration of the directional antenna. For example, the beam-width of a parabolic antenna may be determined by the size and shape of its parabolic reflector and the frequency being transmitted or received. The beam of energy transmitted or received by a parabolic antenna, and certain other directional antennas, may in some instances be referred to as a pencil beam because of its relatively narrow width as compared to the energy radiated by other types of antennas. Antennas may be "polarized" so that signals of differing polarizations can be transmitted or received and discriminated against. Such polarized antennas may assist in capturing only a desired signal.

Omni antennas generally have gains in the region of about 2 dBi to about 10 dBi (dBi refers to the relative gain/directivity of an antenna with respect to an equivalent isotropic antenna, which isotropic antenna radiates in all directions equally, expressed on the decibel logarithmic scale). Sector antennas generally have gains in the range of about 10 dBi to about 16 dBi. Directional antennas generally have a gain greater than about 20 dBi with beam-widths of less than about 10 degrees. In this description, the term "high gain" will generally be used to describe a gain that is higher than the 16 dBi that is typically achieved with generally known sector antennas as described above. Sector and directional antennas need to be pointed, either manually or automatically, towards a target receive system or source transmit system, as their beam-widths are less than 360 degrees. Directional antennas specifically require the most care as their beam-widths are typically less than about 10 degrees and in some cases less than about 1 degree.

Those skilled in the art will understand that the above antenna descriptions apply to both antennas used in transmit systems, as well as antennas used in receive systems. Many antennas can be used as either a transmit or receive antenna, or both in the case of a bi-directional link. In addition, some receive systems can be used as transmit systems, and similarly some transmit systems can be used as receive systems. Although the use of the antennas as disclosed above may be described below in reference to embodiments specifically of a receive or transmit system, those skilled in the art will recognize that many concepts and teachings herein can also be used to implement either or both receive and transmission systems.

Transmit Systems

A transmitter may accept audio, video, and/or other data as its raw input and encode and modulate that data to a frequency required for transmission. The raw data may be compressed and/or encapsulated into an ASI (asynchronous serial interface) transport stream. This stream may be fed to a modulator. The modulator may spread the data out over multiple carriers, for example when the modulator comprises a COFDM modulator. The modulated data is up-converted to the required transmission frequency and may be amplified to the desired power level before being presented to an antenna for transmission. The antenna radiates the wireless energy from the transmitter into the air.

Receive Systems

Traditional receive systems receive the modulated energy and convert the energy back into its original form of audio, video, and/or other data using an antenna to capture the RF energy and a receiver to demodulate the signal. The radiated energy from the transmit system is picked up via the antenna. If the receive system comprises a sector or directional antenna, such antenna needs to be pointed, either manually or automatically, towards the transmit system. This need is due to the fact that the beam-widths of such antennas are less than 360 degrees. The directional antenna specifically requires the most care as the beam-widths are typically less than about 10 degrees and in some cases less than about 1 degree.

The receiver accepts the signal from the antenna. The received signal may be amplified, and then down-converted to the required demodulator input frequency range. The demodulator converts the signal back to a compressed form and/or may convert the signal back into an ASI stream. This converted signal is then fed to the decoder of the receiver, which decoder converts the signal back to the original source material at the decoder's output (for example to audio, video, and/or other data).

Many receive systems, or sites, are located on "high points" within a geographic area. These sites include tops of mountains, hills, buildings, and radio towers. The sites may be unmanned and remotely controlled from a central command and control site, adding additional complexity to the system.

Planning Wireless Systems

When planning a wireless link there are many factors to take into consideration. Important questions include: what are the link and distance requirements? What frequency can be used? What type of terrain will be encountered? Is the terrain urban, rural, mountainous, water? Are there other signals that might interfere with the transmitted signal or are there other signals that might be interfered by the transmitted signal? How much data needs to be transported across the link? Is the transmit platform stationary or mobile? How robust does the system need to be? What is the budget for the system?

The answers to these questions determine what equipment and how complex a system is required to provide an acceptably performing link. Long distances may require higher power transmitters and/or greater gain from the antennas to overcome atmospheric attenuation and fading. Certain wireless links are inherently "line of sight" systems and a transmitted signal will generally not pass through or bend around terrain or buildings. Bouncing off such terrain or buildings creates natural multi-path issues for the system. Thus, even shorter links can suffer from natural multi-path issues. Unnatural multi-path may be an issue if multiple users are allocated the same frequency or the operator wishes to use the same channel simultaneously. Using directional antennas and/or more sophisticated receiver technology may be required to minimize this type of interference. The use of directional antennas, however, may limit the azimuth of signal reception, or continual adjustment of such antennas may be necessary to ensure proper signal reception. Such adjustment may be slow or necessitate laborious input by a trained operator. The use of more sophisticated receiver technology may increase the cost of the system and add complexity.

Data transfer rates within a transmit and receive system are dependent on multiple parameters. For example, three such parameters include modulation type, forward error correction (FEC), and guard interval (GI). Low modulation types with high FEC and long GI typically yield a robust link largely immune to both forms of multi-path, but at the expense of data throughput. For large data throughputs, which are necessary for high-definition (HD) video, a higher modulation type with low FEC and increased GI is needed which reduces the system's immunity to multi-path. In general, an increase in the robustness of a link will necessitate lowering the amount of data that can be transmitted. Similarly, an increase in the amount of throughput will necessitate lowering the error corrections that are included in the signal.

Selecting a receive antenna with a narrowed beam-width (and thus an increased gain) will generally allow a signal to be received from a greater distance and will increase the strength of the received signal. A decrease in the beam-width, however, will necessitate that the antenna be more carefully positioned to correctly receive the signal. Similarly, selecting an antenna that may receive signals over a wide azimuth may decrease the strength at which signals may be received.

Directional Diversity Receive System

Embodiments of the receive system described herein relate to increasing the likelihood of successfully receiving a transmitted wireless signal. The system may be used with a radio frequency (RF) link, for example that may be mobile or temporarily fixed. The RF link may use the digital COFDM (Coded Orthogonal Frequency Division Multiplexing) modulation/demodulation schemes to transmit either encapsulated data or compressed video (Standard-Definition (SD) or High-Definition (HD)). Such transmission may be executed with a Super High Frequency (SHF). Those skilled in the art will appreciate that embodiments described herein may also be utilized to receive wireless signals over a link other than an RF link, or may be used to receive signals that do not utilize the COFDM scheme or are not transmitted with an SHF.

Receive system performance can be enhanced with the addition of diversity. Traditional diversity can be either frequency or spatial. Frequency diversity requires two transmitters on unique frequencies and two receivers; one receiver is set to one of the frequencies and the second receiver is set to the remaining frequency, wherein both signals are received by the same antennas. Spatial diversity uses two receive antennas, sometimes spaced apart by a minimum number of a desired frequency's wavelength, and two receivers, wherein a separate receiver is connected to each antenna. In general, one of a multi-path and signal fading characteristic is good when the other is bad. In some situations, performance is improved as much by using unique frequencies as by using multiple receive antennas. Switching between receiver outputs, manually or automatically, may allow a system to obtain the correct audio, video, and/or data. Frequency and spatial diversity can be combined to add additional robustness.

A system designed for higher data throughput may reduce multi-path interference with antenna choices and the use of diversity. If a platform is mobile, either receive or transmit, the complexity of the system goes up dramatically, requiring computer controlled antennas and auxiliary data links to provide positional information for the control system to "track" the platform. If the mobile platform is a person, the size and weight of the transmit system becomes paramount, requiring a more sophisticated receive system.

One way to enhance traditional spatial diversity of a receive system includes using a third diversity option, which may be referred to as Maximal Ratio Combining (MRC). MRC enhances traditional spatial diversity (i.e. two antennas and two receivers) by considering receiver output quality at a packet level, for example at an ASI transport stream packet level. Each demodulator of the receive system presents, good or bad, packets to the MRC combiner, which in turn generates a good one from any of the demodulators outputting a good packet and then adds the good packet to a combined ASI transport stream. The system then repeats this process of generating a good packet for each subsequent packet. In this way, the decoder may receive a more robust transport stream than would be possible with only one antenna and one receiver. The combining is much more efficient, and can be executed much faster and using more automation than traditional spatial diversity. In some embodiments, MRC systems utilize two (2), three (3), four (4), five (5), six (6) or more antenna and receiver/demodulator combinations.

As with all engineering systems, the selection of the components involves compromises. Budget constraints are generally paramount. Equipment costs can increase dramatically when diversity is required, and larger antennas may not be practical on certain towers and may also be cost prohibitive. Adding antennas at different locations adds recurring costs for the space that those antennas occupy.

Embodiments disclosed herein may include a fully integrated directional diversity receive system for audio, video, and/or data. Disclosed embodiments may allow for receiving a signal with an increased gain, while concurrently receiving the signal over a wider azimuth as compared to receive systems known in the art. Disclosed embodiments additionally may allow a high data throughput while maintaining the robustness of a received signal. To add to this, disclosed embodiments may provide a cost effective system that utilizes diversity to receive wireless signals, for example RF signals.

In some embodiments, a directional diversity receive system comprises at least one steerable high-gain directional antenna and at least one diversity panel antenna. The signals from these antennas may be fed into one or more Maximum Ratio Combining (MRC) Diversity Receiver(s).

As can be seen in a front view of an embodiment of a directional diversity receive system 100, illustrated in FIG. 1, the system 100 may include a plurality of antennas 102 attached to and fixed with respect to a frame 104. The system 100 additionally includes a directional antenna 108 attached to the frame 104. In some embodiments, the directional antenna 108 is moveable with respect to the frame 104 and/or may be steerable such that it may be pointed toward a given signal source or direction.

In the illustrated embodiment, the system 100 comprises five antennas 102*a*-102*e* fixed with respect to the frame. The system 100 is not limited to five fixed antennas, however, and may comprise a greater or lesser number of such fixed antennas 102. In some embodiments, the system 100 comprises one, two, three, four, five, six, seven, eight, nine, ten, or more fixed antennas 102.

In FIG. 1, the frame 104 is illustrated as comprising an upper rim 105 and a plurality of posts 106 extending from the rim 105. In the illustrated embodiment, the system 100 comprises five posts 106*a*-106*e*, each of which is positioned between two of the antennas 102. The rim 105 is illustrated as supporting the posts 106 and may at least partially define the orientation of the posts 106. For example, the posts 106 may be arranged in a circumference about a central area. Each of the antennas 102 is illustrated as being attached to two posts 106, one on each side of the antenna 102. In some embodiments, one or more of the antennas 102 are attached to only one post 106. In some embodiments, one or more of the antennas 102 are additionally or instead attached to the rim 105. In these embodiments, one or more of the posts 106 may be omitted. In some embodiments, the rim 105 is omitted. For example, the frame 104 may comprise a plurality of brackets that mechanically connect a plurality of antennas without the use of a rim. In other embodiments, a rim is disposed underneath a plurality of antennas and/or a plurality of posts.

The frame 104 may be configured as any number of mechanical means that attach a plurality of antennas together. In some embodiments, the system 100 is configured to be relocated as an integral unit such that the fixed antennas 102 and directional antenna 108 may be moved simultaneously. The frame 104 may be made of any material that can secure a plurality of antennas. For example, the frame may comprise an aluminum or other metal material. The frame 104 is not limited to embodiment illustrated in FIG. 1, but may be configured in any number of ways, for example as illustrated and described with respect to FIG. 8.

The plurality of fixed antennas 102 are arranged to provide spatial diversity when receiving a wireless signal. The spatial diversity allows for more accurate and robust reception of the wireless signal, as described above. In some embodiments, the system 100 utilizes COFDM MRC receiver technology. In such embodiments, each fixed antenna 102 is connected to a receiver, and packets are selected for inclusion in a transport stream. In some embodiments, the packets are ASI packets that are selected for inclusion in an ASI transport stream.

In the illustrated embodiment, the plurality of fixed antennas 102 comprise a plurality of sector antennas. The plurality of sector antennas allow the system 100 to receive signals over a wide azimuth, while providing an increased gain at each antenna compared to the use of an omni antenna. The sector antennas may comprise panel antennas or any other type of sector antenna. In some embodiments, the antennas 102 comprise one or more reconfigurable diversity panel antennas. In the illustrated embodiment, the sector antennas comprise "can" antennas. Such "can" antennas may comprise a slotted dipole type antenna, for example configured as a cavity backed dipole array. Each sector antenna of the system 100 may comprise the same type of sector antenna, or a combination of different types of sector antennas can be used.

Each of the fixed antennas 102 may be configured similar to every other fixed antenna, or the system 100 may comprise a plurality of differently configured fixed antennas 102. In some embodiments, the fixed antennas 102 each have a gain of approximately 12 dBi. In other embodiments, the fixed antennas each have a gain of approximately 8 dBi. In still other embodiments, antennas of a plurality of different gains are implemented. One or more of the antennas may have an azimuth of reception of approximately 75 degrees, and may have an elevation of reception of approximately 38 degrees. One or more of the antennas may be polarized, for example to exhibit vertical polarization, and one or more antennas may be configured with a quad pole. For example, two cavities each having a dipole antenna and attached to a single panel, as illustrated in FIG. 1, may be configured as a quad pole. Alternatively, an antenna having a single antenna may be configured with a quad pole.

Figure 2:
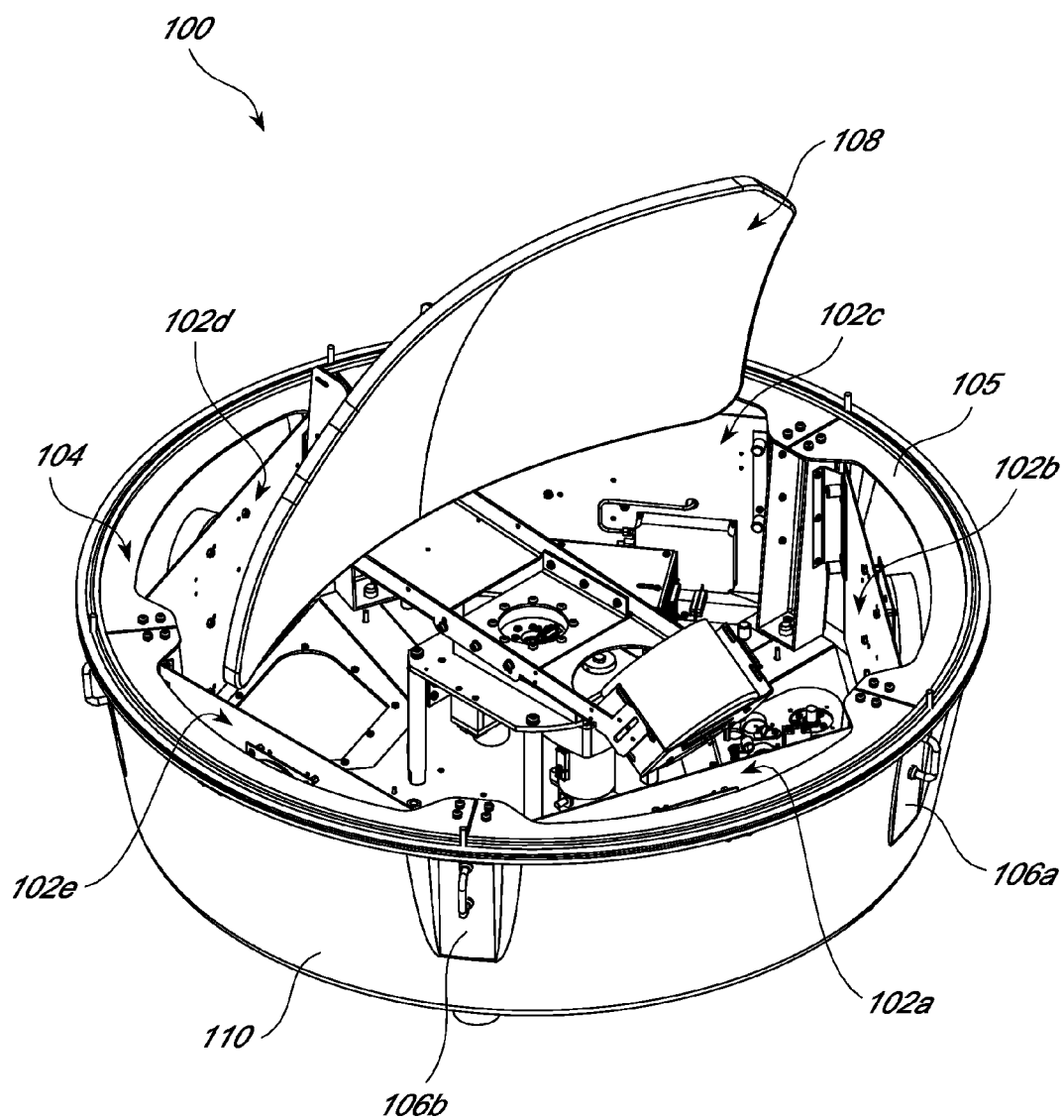
FIG. 2 is a perspective view of the embodiment of the diversity receive system of FIG. 1, and shows a partial enclosure.

FIG. 2 shows a perspective view of the system 100. As can be seen, the system 100 is illustrated as having a cover 110 partially enclosing the system 100. The embodiment shown is configured with the cover 110 surrounding the antennas 102a-102e. In this configuration, the cover 110 may protect the antennas 102a-102e while still allowing the directional antenna 108 to freely operate. The cover 110 may additionally comprise a lower surface (not shown) that wholly or partially encloses the portion of the system 100 facing in a downward direction in FIG. 2.

In the illustrated embodiment, the cover 110 is attached to the rim 105. In other embodiments, the cover 110 may be attached to one or more of the posts 106 or any other portion of the system 100 to secure the cover 110. Although the cover 110 is illustrated as being substantially circular, the cover 110 may be configured in any number of shapes or sizes. The cover 110 may be made from a variety of materials that allow wireless signals to be received by the antennas 102a-102e from an area outside of the cover 110, for example from a plastic or alloy material.

The directional antenna 108 may be movable with respect to the frame 104 and/or the cover 110. In this way, the directional antenna 108 may be steered so as to rotate to face a plurality of directions. In some embodiments, the directional antenna 108 is configured to rotate 360 degrees. Thus, the directional antenna 108 can face, and receive signals from, any direction. In this way, the frame 104 and/or the cover 110 can be anchored to a structure while still allowing the directional antenna 108 to freely rotate. In other embodiments, the directional antenna is fixed with respect to the frame 104, and the frame 104 and the directional antenna 108 may be configured to rotate in unison. In such embodiment, the frame 104 may be configured to rotate within the cover 110. Some embodiments of the system 100 comprise a servo or other motor or mechanism for causing the directional antenna 108 to rotate.

A gain of the directional antenna 108 may be greater than a gain of any of the fixed antennas 102. In the illustrated embodiment, the directional antenna 108 is depicted as a parabolic antenna, and the directional antenna 108 has a gain greater than any of the sector antennas 102a-102e. For example, the gain of the directional antenna 108 may be about 20 dBi when receiving a signal in a frequency band of approximately 1.9-2.5 GHz, about 22 dBi when receiving a signal in a frequency band of approximately 4.9 GHz, or about 26 dBi when receiving a signal in a frequency band of approximately 6.5-7.2 GHz. Alternatively, the gain of the directional antenna may be approximately the same when receiving over several frequency bands. For example, the gain of the directional antenna may be about 16 dBi when receiving a wireless signal in any of the above-described frequency bands. In comparison, the sector antennas 102a-102e described above may have gains ranging from approximately 8 dBi-12 dBi. In some embodiments, the gain of the directional antenna 108 is approximately twice the gain of any of the fixed antennas 102. The directional antenna 108 may be polarized, for example to exhibit vertical polarization, or may be configured with a quad pole.

Figure 3:
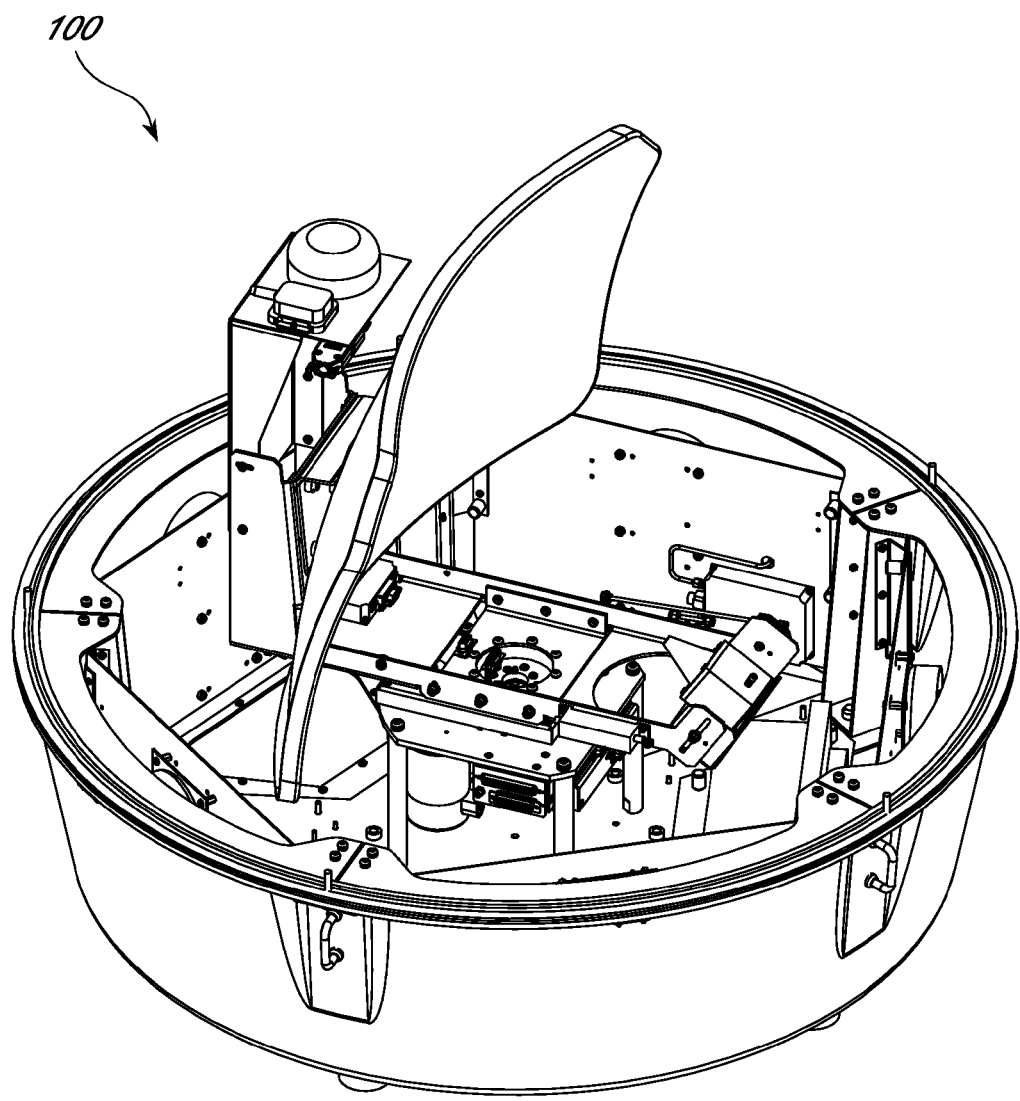
FIG. 3 is a perspective view of another embodiment of a directional diversity receive system.
Figure 8:
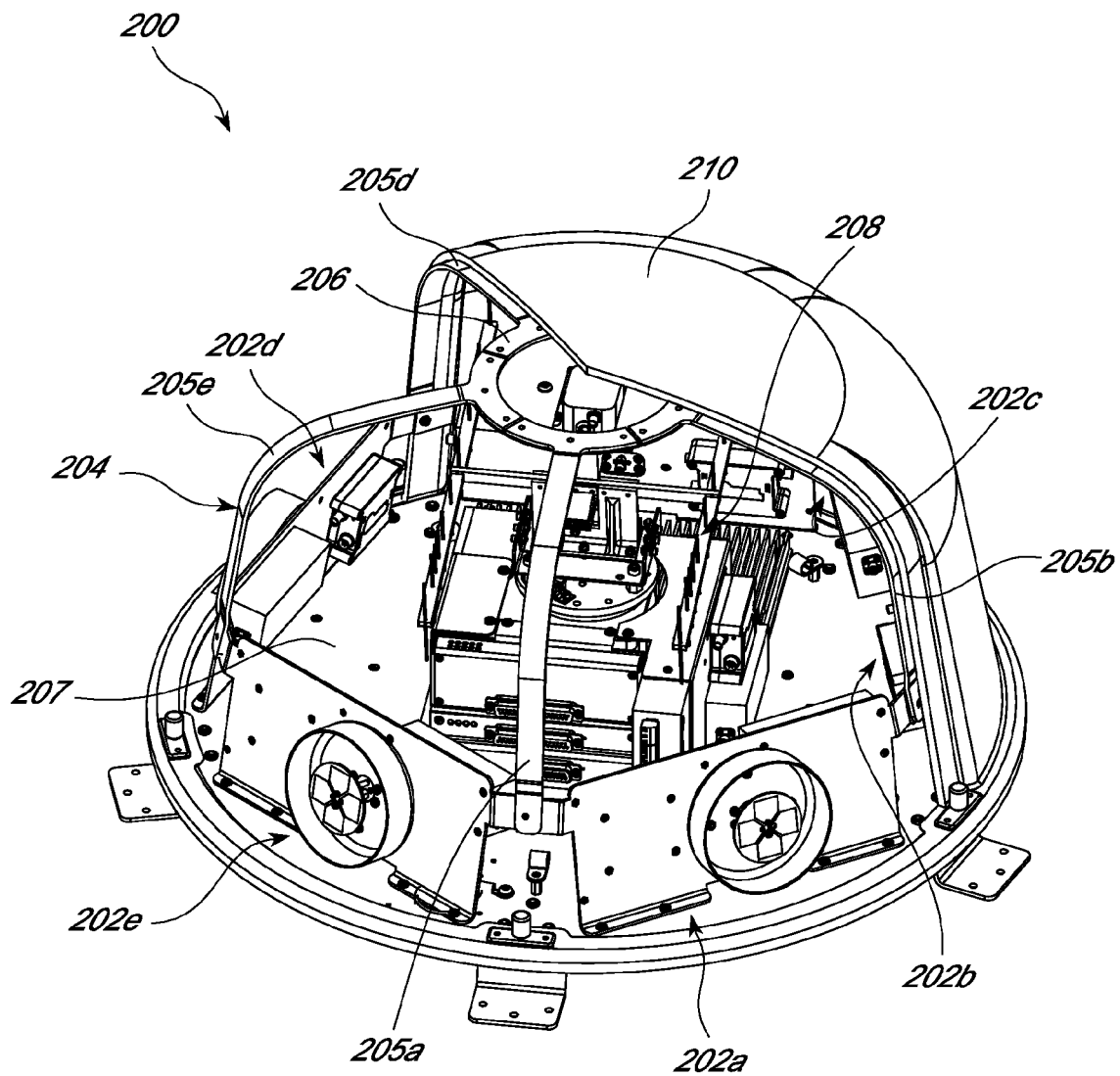
FIG. 8 is a perspective view of an embodiment of a directional diversity receive system.

Those of skill in the art will understand that the above descriptions of the antennas 102 and 108 are not exhaustive of the different types, configurations, or combinations of antennas that may be implemented in the system 100. For example, the directional antenna 108 may comprise a parabolic antenna having a different configuration, as shown in FIG. 3, or may comprise a different type of directional antenna, such as a yagi antenna as illustrated in FIG. 8. Those of skill in the art will recognize additional types, configurations, and combinations of antennas that may be implemented in the system 100 in accordance with the principles described above.

Figure 4:
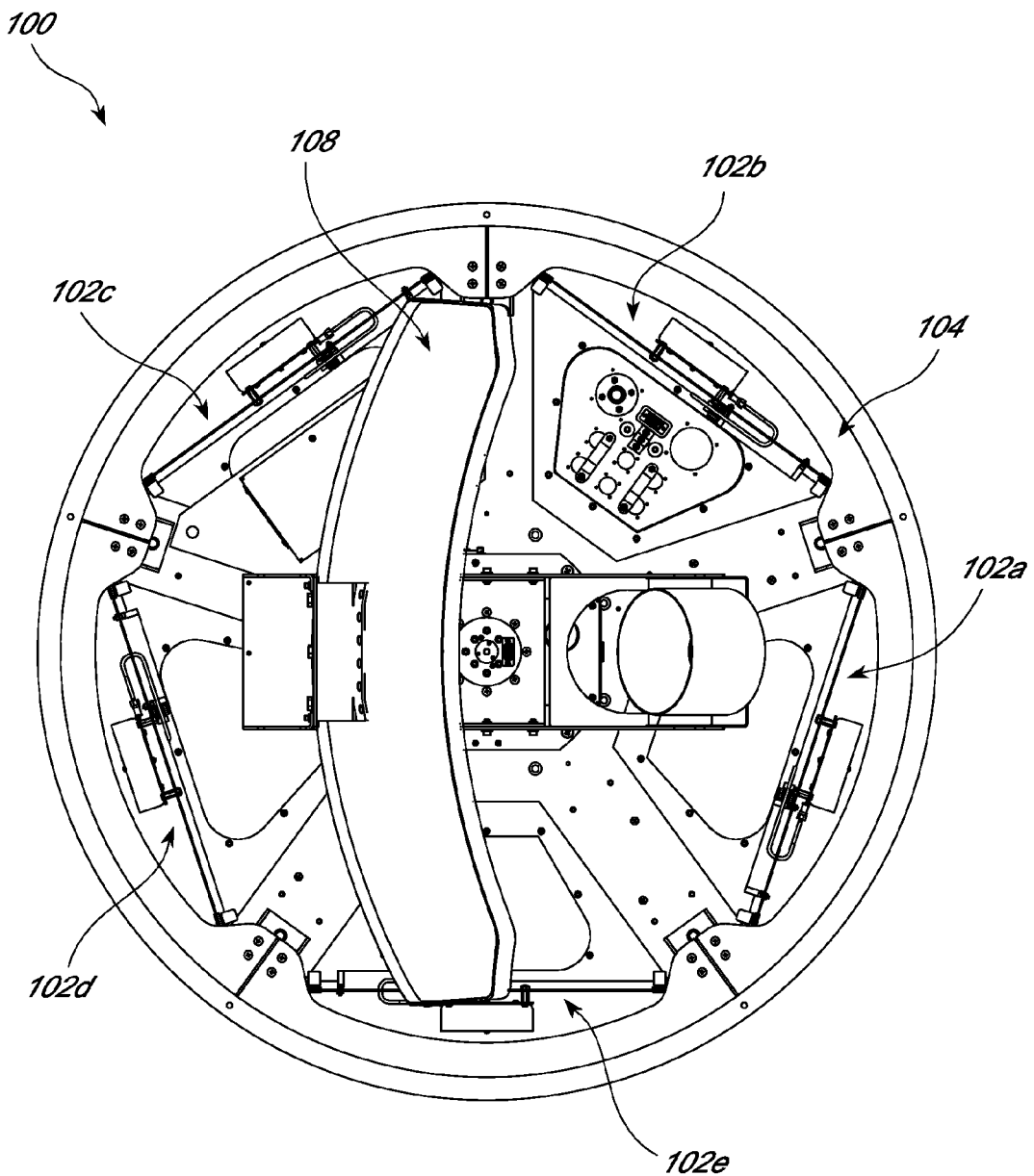
FIG. 4 is an overhead view of the embodiment of the directional diversity receive system of FIG. 2.

As can be seen in an overhead view of the system 100, illustrated in FIG. 4, the fixed antennas 102 and/or the frame 104 may be arranged to define a circumference. In the illustrated embodiment, the frame 104 and fixed antennas 102 form a perimeter around the directional antenna 108, and are arranged to receive a wireless signal from any direction within a 360 degree azimuth. Thus, the fixed antennas 102 may receive a wireless signal regardless of the direction from which it was transmitted or redirected by environmental factors. In some embodiments, each of the illustrated fixed antennas 102a-102e receives a wireless signal over an azimuth of approximately 70-80 degrees.

In the illustrated embodiment, the fixed antennas 102 are equally spaced and angled about the circumference. Thus, the fixed antennas 102 form the shape of a pentagon. Such configuration will increase the likelihood of receiving a wireless signal regardless of the direction from which it is being propagated. The fixed antennas 102 are configured to receive signals at least from a direction opposite the inside of the pentagon. In other embodiments, the fixed antennas 102 are not equally spaced or are not equally angled about the circumference.

In some embodiments, the fixed antennas 102 do not form a circumference. For example, the fixed antennas 102 may be arranged to primarily face in one or several directions. Such arrangement may be beneficial, for example, when signals are likely only to be received from certain directions and when it is possible to implement such arrangement using fewer fixed antennas to reduce costs. The azimuth over which a fixed antenna may receive signals may be selected based on the requirements of the system 100.

In some embodiments, one or more of the fixed antennas 102 comprise an aluminum panel. The aluminum panel comprises a large ground plane to improve the performance of the fixed antennas 102. In other embodiments, one or more surfaces of the fixed antennas 102 are coated with a metal material. Such surface coating may reduce the amount of radiation that is absorbed through the back of an antenna. Thus, the antenna can be configured to receive signals from only directions that the antenna faces.

In some embodiments, one or more of the fixed antennas 102 are configured to detach from the frame 104. When detached, the one or more antennas can be remotely mounted away from the frame 104 and will still receive wireless signals. These signals can be used by the system 100 to provide audio, data, and/or video as described above. Such detachment may be useful in providing greater spatial diversity than when all of the fixed antennas 102 are attached to the frame 104, and allows for an antenna arrangement that is customizable by a user of the system 100.

The directional antenna 108 may be configured to implement MRC technology in association with the fixed antennas 102. Thus, the system 100 would be able to receive a signal using any of the attached antennas and generate a packet of data from the received signal. In this way, an unexpected shift in the direction from which a signal is being received will not substantially affect proper reception of the signal. Even if the quality of a signal as received at one of the antennas degrades, it is likely that another one of the antennas will receive the signal with sufficient quality. The directional antenna 108 may be configured to receive wireless signals modulated according to a COFDM scheme.

In the illustrated embodiment, the single directional antenna 108 is located within a circumference of the fixed antennas 102. In other embodiments, the directional antenna 108 may be located outside of the circumference, or the fixed antennas 102 may not form a circumference. In still other embodiments, more than one directional antenna 108 may be provided.

While the fixed antennas 102 may receive signals from a larger number of directions at a given time, the directional antenna 108 may receive the signals with a higher gain. Thus, benefits of spatial diversity can be combined with benefits of increased signal strength. The number of antennas and configuration of each antenna can be selected based on desired use or location of the system 100, or according to cost requirements. Thus, a cost-effective system for reliably receiving a signal from any direction may be implemented.

Figure 5:
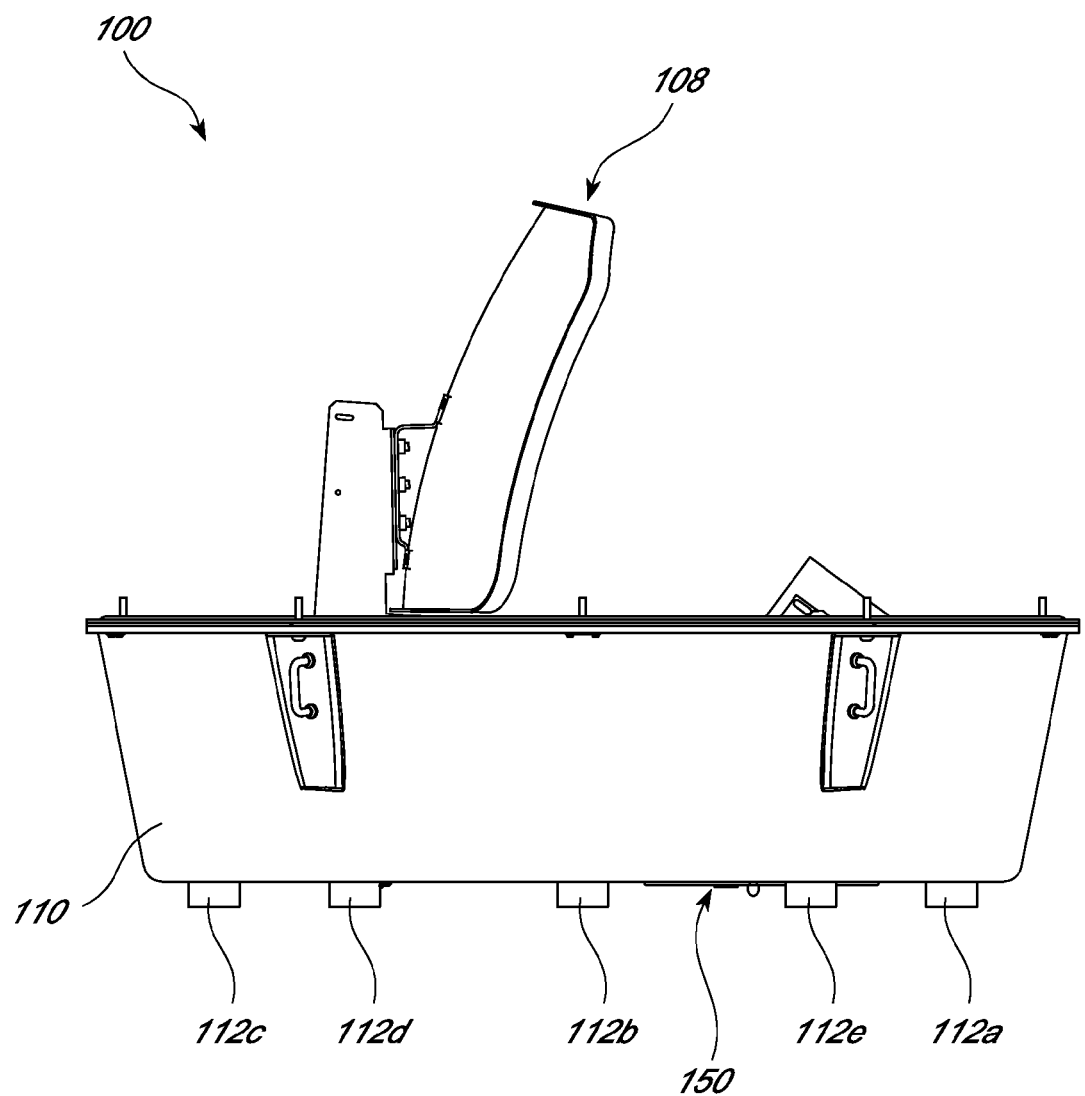
FIG. 5 is a side view of the embodiment of the directional diversity receive system of FIG. 2.
Figure 6:
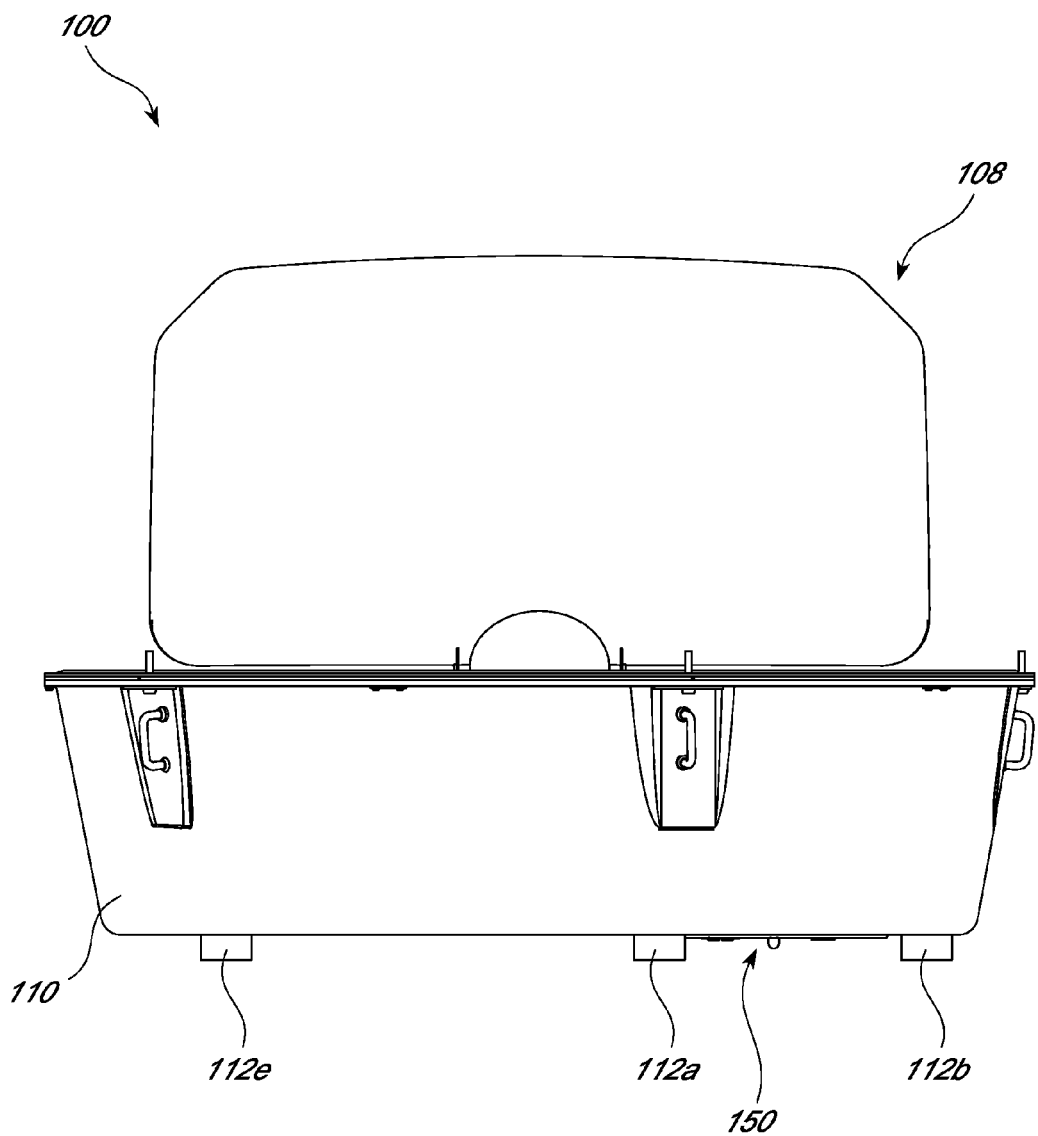
FIG. 6 is a front view of the embodiment of the directional diversity receive system of FIG. 2.

As can be seen in a side and front view of the system 100, illustrated in FIG. 5 and FIG. 6, respectively, the cover 110 may completely encase a lower portion of the system 500. In the illustrated embodiment, the cover 110 surrounds the circumference defined by the frame 104 and the antennas 102. The cover 110 comprises a plurality of feet 112a-112e that may be configured to mount or anchor to a surface or structure. In other embodiments, one or more of the feet 112a-112e are omitted. The feet 112 may be configured as any supports on which the system 100 can rest or be anchored. In some embodiments, the cover 110 has a plurality of holes formed in a lower surface thereof to allow supports formed on the frame 104 to pass through the cover 110 and contact a mounting surface or structure.

The embodiment illustrated in FIGS. 5 and 6 shows an output 150 accessible from a lower surface of the cover 110. In other embodiments, the output 150 is accessible from a side of the cover 110, or is only accessible from inside the cover 110. The output 150 may output data received at one or more of the antennas 102. The output data may first be down-converted to a lower frequency, amplified, and/or demodulated, for example by a receiver or demodulator. In some embodiments, the system 100 comprises a plurality of outputs, for example an output that corresponds to each of the antennas 102a-102e. In some embodiments, the system 100 is configured with a single output for outputting data received at all of the antennas 102 and 108. In this configuration, the output may transmit packets to another device, for example a controller or combiner configured to implement an MRC selection of the data and/or packets received from the output. In some embodiments, the output 150 is configured to accept a single multi-core control cable, and is further configured to transmit data over the control cable to a controller.

Figure 7:
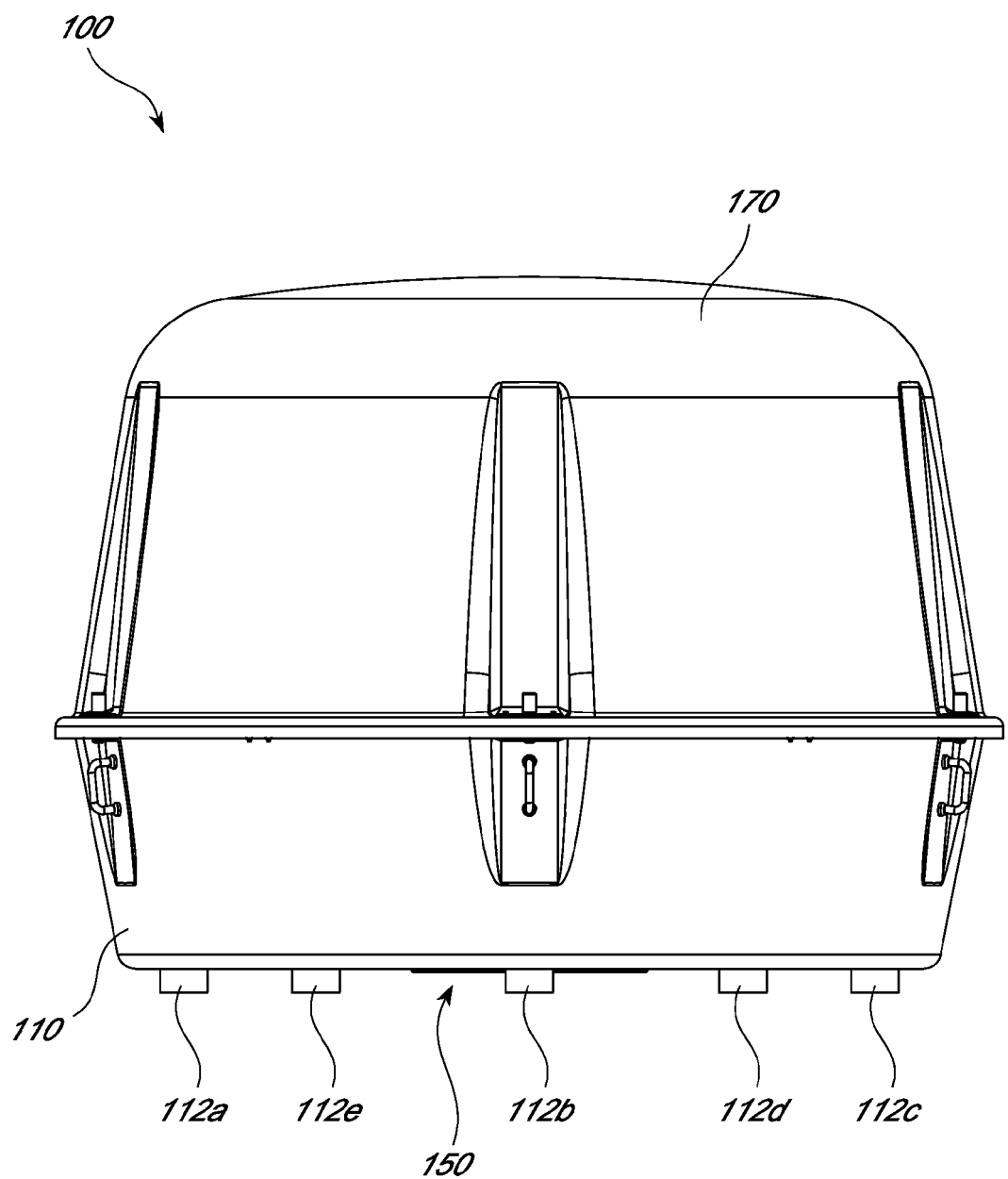
FIG. 7 is another side view of the embodiment of the directional diversity receive system of FIG. 2, and shows a full enclosure.

FIG. 7 shows another side view of the system 100, where the side view is taken from the side furthest from the viewer in FIG. 5. As can be seen, the system 100 is illustrated as having a cover 170 partially enclosing the system 100. The embodiment shown is configured with the cover 170 surrounding the directional antenna 108. The cover may wholly or partially enclose the portion of the system 100 above the rim 105. In the illustrated embodiment, the cover 110 and the cover 170 cooperate to complete enclose the antennas 102, the frame 104, and the directional antenna 108. In this way, the system 100 may be completely encased.

The cover 170 may be attached to the rim 105, one or more of the posts 106, the cover 110, or any other portion of the system 100. Although the cover 170 is illustrated as being substantially circular, the cover 170 may be configured in any number of shapes or sizes. The cover 170 may be made from a variety of materials that allow wireless signals to be received by the directional antenna 108 from an area outside of the cover 170, for example from a plastic or alloy material. The covers 110 and 170 may have a solid construction, as shown in FIG. 7, or one or both of the covers 110 and 170 may have one or more holes formed therein.

Those skilled in the art will appreciate that the system 100 may be configured for relocation as an integrated module. Thus, the plurality of fixed antennas 102, the frame 104, and the directional antenna 108 may be integrated into a single unit that combines a plurality of panel antennas with a directional antenna of higher gain. For example, the antennas and frame may all be mechanically connected, as described above, or enclosed within one or more covers, also as described above. In this way, spatial diversity can be achieved by the panel antennas and increased signal reception strength can be achieved by the directional antenna. In addition, the integrated unit reduces the cost to the user by allowing the user to implement the spatial diversity and increased signal reception strength in a limited spatial area. In some embodiments, the enclosed system 100 including the covers 110 and 170 is less than approximately 35 inches high by 45 inches wide by 45 inches in depth. In one embodiment, the enclosed system 100 including the covers 110 and 170 is approximately 29.125 inches high by 40 inches in diameter when measured without the feet 112. In one embodiment, the feet 112 are approximately one inch tall.

FIG. 8 shows a perspective view of an embodiment of a directional diversity receive system 200. The system 200 may include a plurality of antennas 202 attached to and fixed with respect to a frame 204. The system 200 additionally includes a directional antenna 208 attached to the frame 204. The system 200 may further include a cover 210 configured to partially or wholly encase the system 200.

Figure 9:
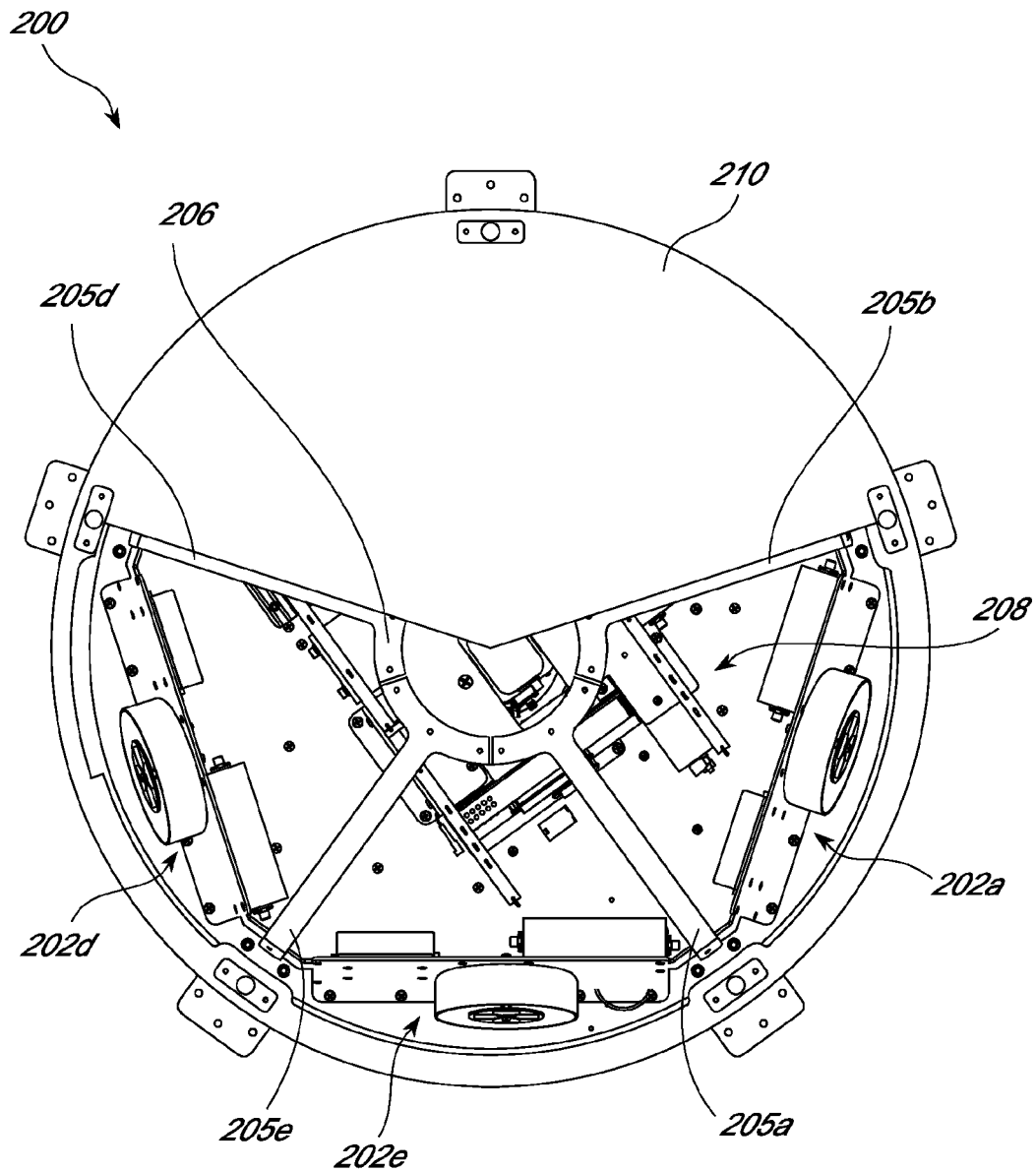
FIG. 9 is an overhead view of the embodiment of the directional diversity receive system of FIG. 8.

The frame 204 is illustrated in FIG. 8 as comprising a plurality of support arms 205 extending down from a rigid ring 206 centrally disposed within the system 200. In the illustrated embodiment, the system 200 comprises five support arms 205a-205e (arm 205c is not illustrated in FIG. 8), each of which downward from the rigid ring 206 towards an area between two of the antennas 202. The ring 206 may at least partially define the orientation of the arms 205, and the ring 206 and/or one or more of the support arms 205 may support the cover 210 so that the cover 210 does not interfere with the operation of the directional antenna 208. The arms 205 may be arranged in a circumference about a central area, similar to how the posts 106 described with respect to the system 100 are arranged. Although the ring 206 is illustrated as being centrally disposed within the system 200 and the arms 205 are illustrated as extending from this central location, as can be most easily seen in an overhead view of the system 200 illustrated in FIG. 9, the ring 206 may be located at a different location and in some embodiments is not formed as a ring.

Each of the antennas is shown as being attached to a lower surface 207 of the system 200. In addition, each of the antennas 202 is illustrated as being supported in an upright configuration by two support arms 205, one on each side of the antenna 202. In some embodiments, one or more of the antennas 202 are attached to only one arm 205. In some embodiments, one or more of the antennas 202 are not attached to any support arms, but are fully supported by their attachment to the lower surface 207. In some embodiments, one or more of the antennas 202 are not supported by the lower surface 207 but instead are supported by one or more support arms or by other antennas.

As described above with respect to the system 100, the frame 204 may be configured as any number of mechanical means that attach a plurality of antennas together. In some embodiments, the system 200 is configured to be relocated as an integral unit such that the fixed antennas 202 and directional antenna 208 may be moved simultaneously. The frame 204 may be made of any material that can secure a plurality of antennas, and may otherwise be configured similar to the frame 104 described with respect to the system 100.

The plurality of fixed antennas 202 are arranged to provide spatial diversity when receiving a wireless signal. In the illustrated embodiment, each of the plurality of fixed antennas 202 comprise a sector antenna. The sector antennas are as dipole antennas each having a single cavity, in contrast the antennas 102 illustrated in FIG. 1. Each sector antenna 202 of the system 200 may comprise the same type of sector antenna, or a combination of different types of sector antennas can be used.

Each of the fixed antennas 202, however, may be configured similar to every other fixed antenna, or the receive site system 200 may comprise a plurality of differently configured fixed antennas 202. The antennas 202 may otherwise be configured similar to the plurality of antennas 102 described above with respect to the system 100.

The cover 210 is illustrated as being cut away so as to show the components of the system 200 in detail. The cover 210, however, may span over the entirety of the frame 204. In this way, the cover 210 may cooperate with the lower surface 207 to wholly enclose the system 200. In other embodiments, the cover 210 only partially encloses the system 200. The cover 210 may attach to the lower surface 207, the frame 204, and/or any other portion of the system 200. Although the cover 210 is illustrated as being substantially circular, the cover 210 may be configured in any number of shapes or sizes. The cover 210 may be made from a variety of materials that allow wireless signals to be received by the antennas 202a-202e and 208 from an area outside of the cover 210, for example from a plastic or alloy material. The cover 210 may otherwise be configured similar to the cover 110 described above with respect to the system 100.

Figure 10:
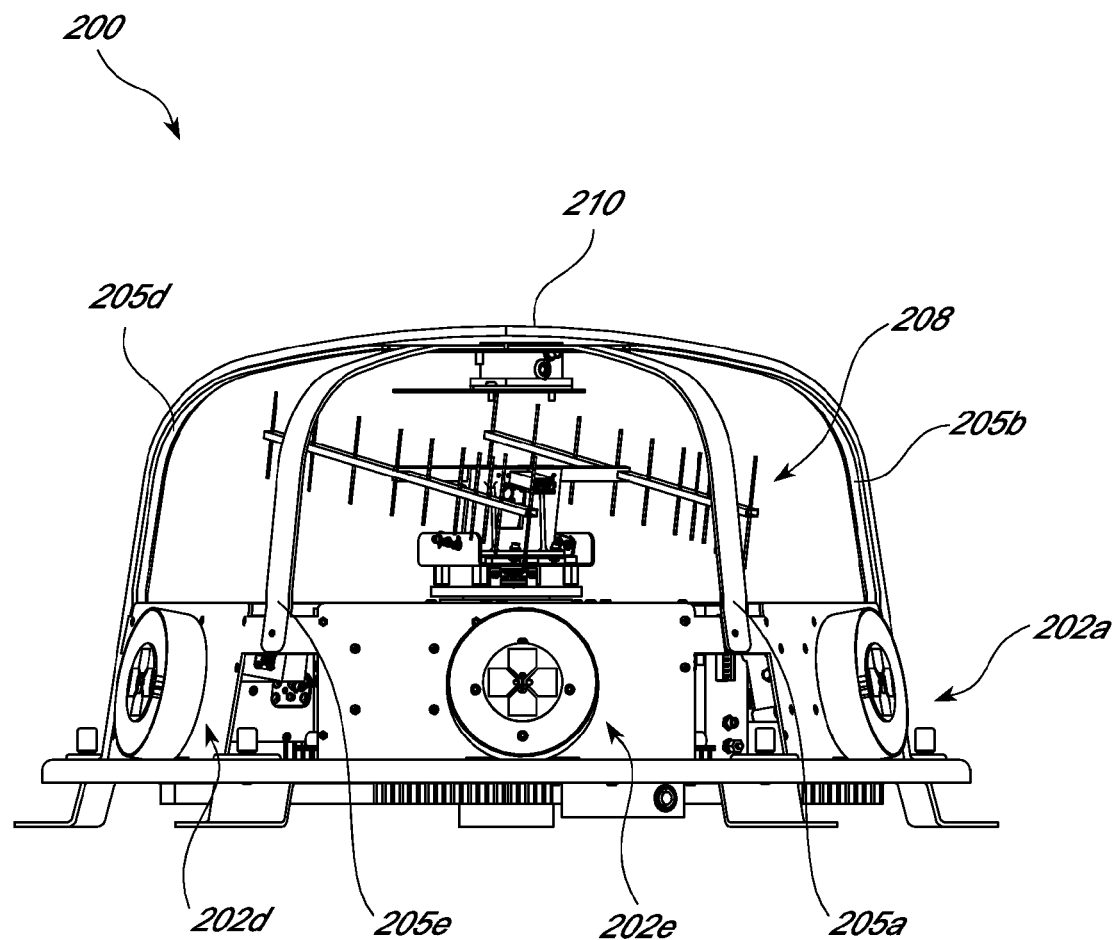
FIG. 10 is a front view of the embodiment of the directional diversity receive system of FIG. 8.
Figure 11:
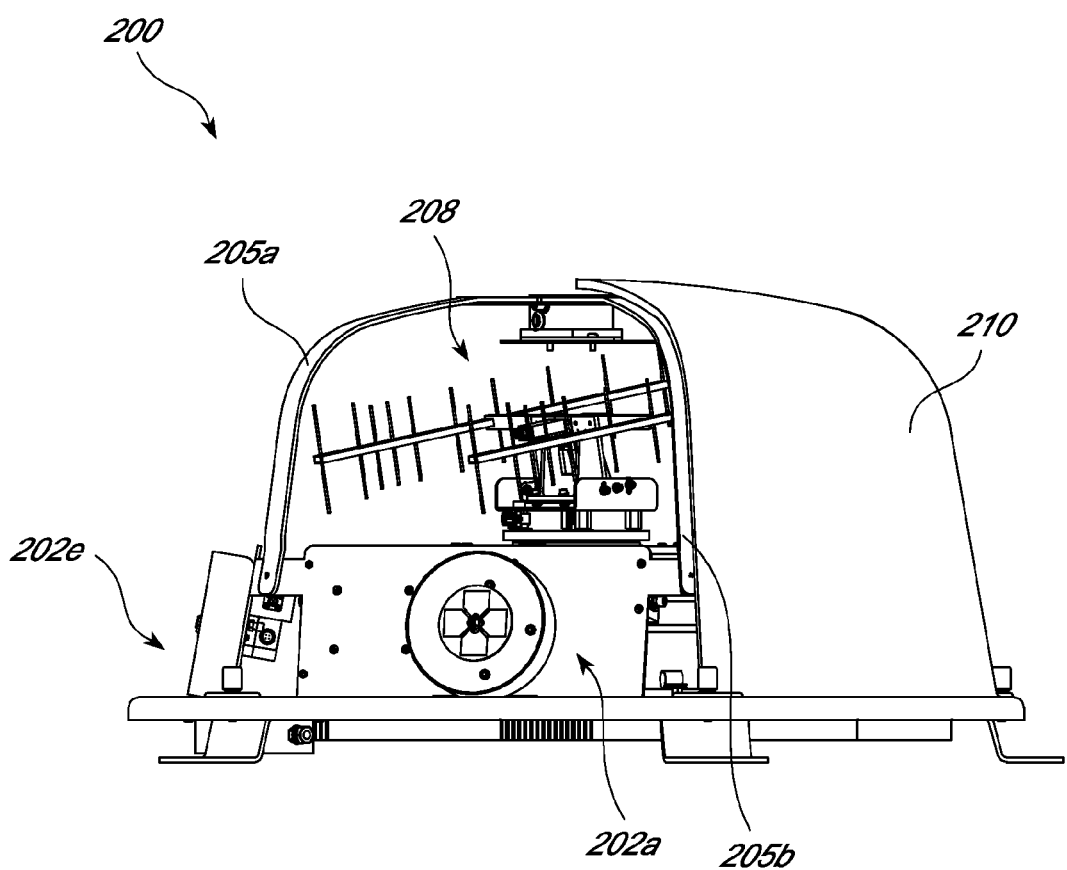
FIG. 11 is a side view of the embodiment of the directional diversity receive system of FIG. 8.

A gain of the directional antenna 208 may be greater than a gain of any of the fixed antennas 202. In the illustrated embodiment, the directional antenna 208 is depicted as a two-element yagi antenna, as can be seen in detail in a front view and a side view of the system 200, illustrated in FIG. 10 and FIG. 11, respectively. The directional yagi antenna 208 has a gain greater than any of the sector antennas 202a-202e, and may be movable with respect to the frame 204 and/or the cover 210. The directional antenna 208 may otherwise be configured similar to the directional antenna 108 described above with respect to the system 100.

Those skilled in the art will appreciate that the system 200 may be configured for relocation as an integrated module. Thus, the plurality of fixed antennas 202, the frame 204, and the directional antenna 208 may be integrated into a single unit that combines a plurality of panel antennas with a directional antenna of higher gain. In some embodiments, the system 200 is smaller in one or more physical dimension than the system 100. This difference in size may be due to the use of individual components which are smaller in nature, for example a yagi antenna as compared to a parabolic antenna, or a panel antenna having a single cavity as compared to a panel antenna having two cavities. The difference in size may also be due to the design of the frame 204 as compared to the design of the frame 104, or due to some other factor not herein discussed. In some embodiments, the enclosed system 200 including the cover 210 is less than approximately 15 inches high by 30 inches wide by 30 inches in depth. In one embodiment, the enclosed system 200 including the cover 210 is approximately 13.5 inches high by approximately 25 inches in diameter when measured without the feet. In one embodiment, the enclosed system 200 including the cover 210 is approximately 13.5 inches high by approximately 27 inches in diameter when measured with the feet. The system 200 may otherwise be configured similar to the system 100. For example, the system 200 may comprise a single output.

Figure 12:
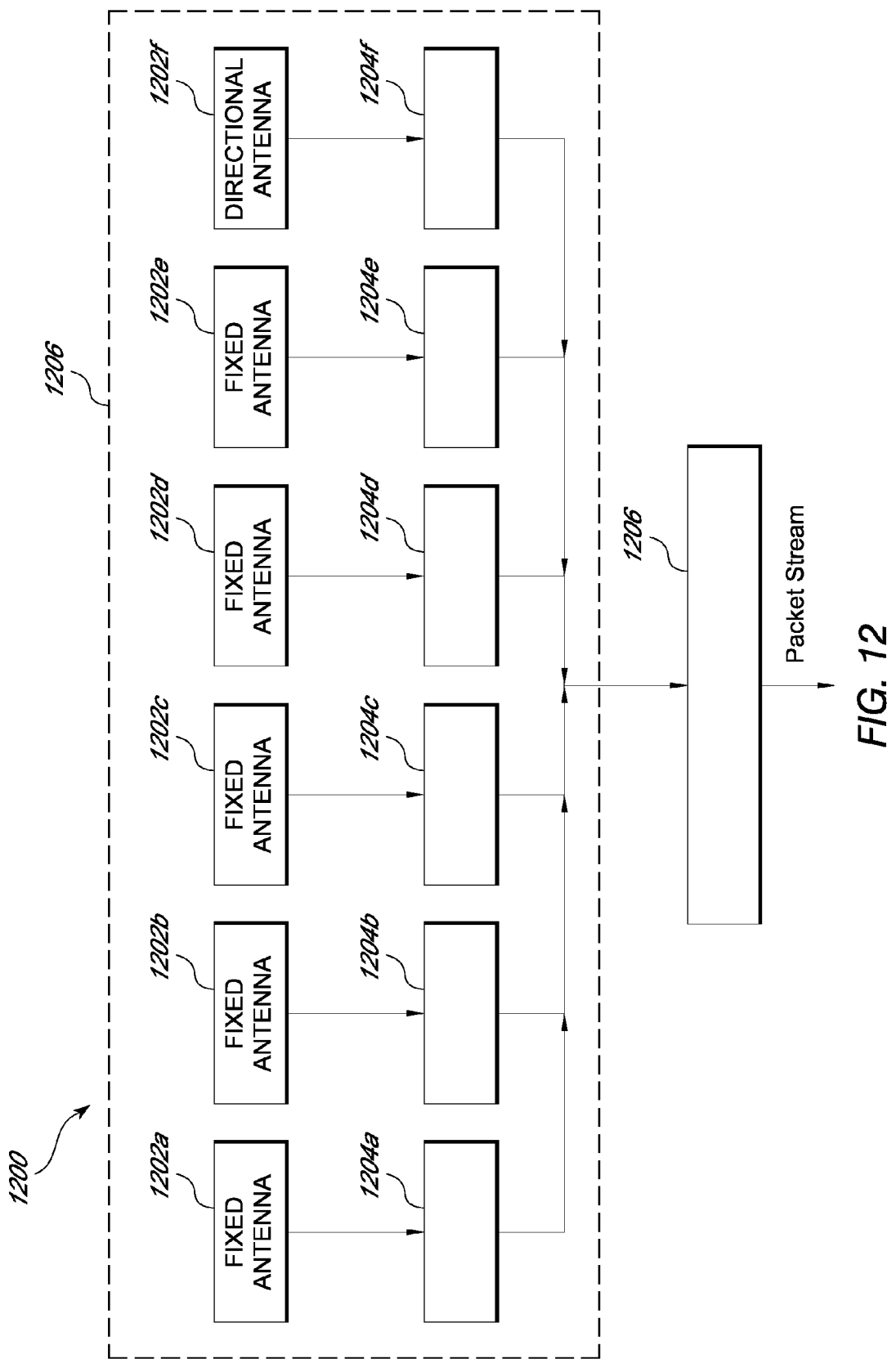
FIG. 12 is a functional block diagram of an embodiment of a directional diversity receive system.

FIG. 12 is a functional block diagram of an embodiment of a directional diversity receive system 1200, for example as may be used to implement the system 100 or 200 described above. The system 1200 comprises a plurality of antennas 1202. The plurality of antennas may comprise one or more directional antennas, for example as illustrated by an antenna 1202f, in combination with one or more fixed antennas, for example as illustrated by antennas 1202a-1202e. The directional antenna 1202f may be moveable and the fixed antennas 1202a-1202e may be fixed with respect to the directional antenna 1202f. The fixed antennas 1202a-1202e may comprise sector antennas. In the illustrated embodiment, six antennas 1202a-1202f are shown. The antenna 1202f may represent the antenna 108 or 208 of FIGS. 1 and 8, respectively, and the antennas 1202a-1202e may represent the antennas 102 or 202 of FIGS. 1 and 8, respectively. In some embodiments, a greater or lesser number of antennas are used. The types and combinations of antennas may vary from those described above.

The system 1200 may further comprise a plurality of receivers/demodulators 1204a-1204f and a combiner/controller 1206. Each of the receivers/demodulators 1204a-1204f are connected to a respective one of the antennas 1202a-1202f. The receivers/demodulators 1204a-1204f are configured to convert wireless signals received by the antennas 1202a-1202f into appropriate electrical signals and to demodulate and decode the appropriate electrical signals. For example, the receivers/demodulators 1204a-1204f may be configured to convert an RF signal into a baseband or intermediate signal, and may be further configured to decode data into a bit stream. The receivers/demodulators 1204a-1204f are further configured to present data, for example in the form of packets containing the data, to the combiner/controller 1206. In some embodiments, the packets comprise ASI packets.

The illustrated embodiment shows that the antennas 1202a-1202f and the receivers/demodulators 1204a-1204f may be combined within a single unit 1210. For example, the unit 1210 may comprise the cover 110 and/or the cover 170 illustrated in FIG. 7, or the unit 1210 may comprise the cover 210 illustrated in FIG. 8. Thus, the systems 100 and 200 may comprise receivers/demodulators in addition to the components already described above. Each receiver/demodulator may be attached to the frame 104 or 204, and each may be connected to a respective antenna 102a-102e and 108, or 202a-202e and 208. It will be appreciated, however, that all the functionality of FIG. 12 need not be wholly enclosed, and that the functionality of FIG. 12 may be implemented in the same or separate devices, circuits, or software modules. For example, the receivers/demodulators 1204a-1204f may be implemented on a single chip, but may process data received from the antennas 1202a-1202f individually.

The data presented to the combiner/controller 1206 by the receivers/demodulators 1204a-1204f may be presented in a single output or stream, as illustrated in FIG. 12. Thus, the data output by the receivers/demodulators 1204a-1204f may be communicated using the single output 150 of the system 100. In other embodiments, each of the receivers/demodulators 1204a-1204f present data individually to the combiner/controller 1206. In still other embodiments, one or more of the receivers/demodulators 1204a-1204f present data individually to the combiner/controller 1206, while others of the receivers/demodulators 1204a-1204f present data in a combined stream.

The combiner/controller 1206 is configured to receive data, for example in the form of packets which may comprise ASI packets, from each of the receivers/demodulators 1204a-1204f, and to generate a good packet from the packets output by the receivers/demodulators 1204a-1204f. This good packet is output for reproduction, for example to a HD or SD video decoder. Each successive good packet is output by the combiner/controller 1206 to produce a combined packet stream suitable for reproduction. In this way, the receive system 1200 may be configured to implement MRC by receiving wireless signals with the plurality of antennas 1202. In this way, multipath propagation and/or shifts in the direction from which a signal is being received will not substantially affect proper reception of the signal. In the illustrated embodiment, the combiner and controller is illustrated as being a single device, but in some embodiments the combiner and controller may be implemented in separate devices, circuits, or software modules, or there may be a plurality of combiners and/or controllers.

In some embodiments, the receive system 1200 further comprises means for down-converting or up-converting the signal frequency to fit the frequency expected by a receiver, which may be implemented instead of or in addition to the receivers/demodulators 1204a-1204f. Also, in some embodiments, the receive system 1200 further comprises means for filtering of a signal, for example filtering of an RF signal. Additionally, in some embodiments, the receive system 1200 further comprises a means for individual antenna polarization.

In some embodiments, the receivers/demodulators 1204a-1204f and/or the combiner/controller 1206 is configured to calculate metrics describing the amount and quality of wireless signal (which may be called "receiver metrics") being received by the antennas 1202a-1202f. These metrics can be use, for example by the combiner/controller 1206, to determine which antenna received the signal with the greatest strength or quality. Such information may be presented to a user of the receive system 1200, for example using a display device (not illustrated), or may be used by the combiner/controller 1206 to command a directional antenna of the system 1200 to rotate. Such movement may increase or maximize the signal energy being received by the directional antenna. The system 1200 can then maintain this relationship in which the directional antennas receives a maximized signal energy by constantly evaluating the receiver metrics and adjusting the position of the directional antenna.

Figure 13:
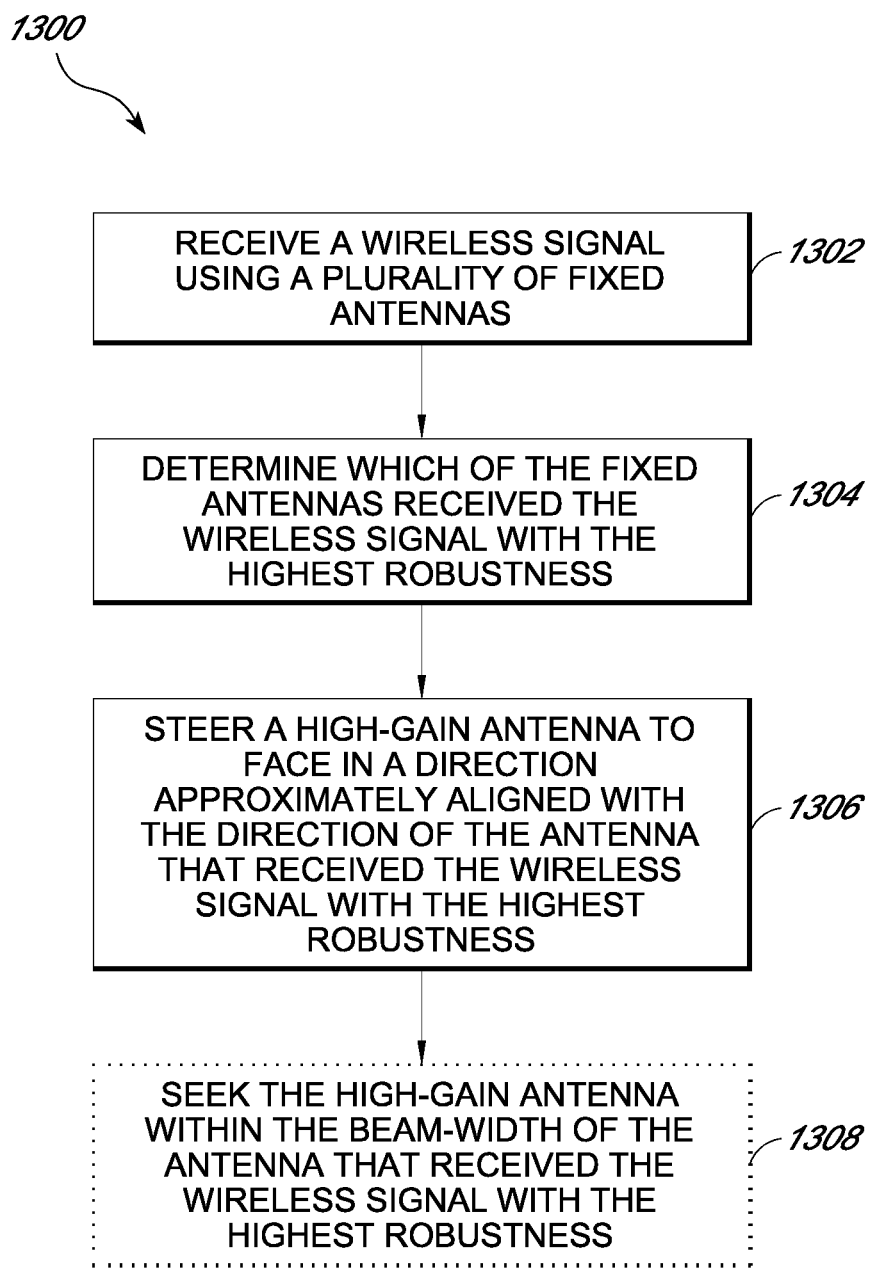
FIG. 13 is flowchart illustrating a method of receiving a signal at the embodiment of the directional receive system of FIG. 1.

FIG. 13 is flowchart illustrating a method 1300 of receiving a signal at a directional receive system, for example at the system 100 illustrated in FIG. 1. The acts associated with the method 1300 may be performed by different configurations of the system 100 than those herein described. Those skilled in the art will know how to extend the method described to different configurations of the receive site system 100.

At block 1302, a wireless signal is received using a plurality of fixed antennas. As described above, the fixed antennas may be arranged to provide spatial diversity.

At block 1304, it is determined which of the fixed antennas received the wireless signal with the highest robustness. The robustness may be determined using a variety of parameters. For example, at least one of a signal to noise ratio, a modulation error ratio, a signal strength, and a pre-Viterbi or post-Viterbi bit error rate may be used in the determination. The pre-Viterbi and/or post-Viterbi bit error rate may indicate the proportion of error correction that is performed on a signal, and may reveal the portions of the signal that are recovered. The determination may be performed by any sort of computer, controller, microcontroller, or other logic device. The determination process can be automated such that a user or operator of the receive site system need input little or no information.

At block 1306, a directional antenna is rotated so as to approximately align with the direction of the fixed antenna that received the wireless signal with the highest robustness. In this way, the chances of properly receiving the wireless signal at the receive site system can be greatly increased. Not only can the fixed antennas be used to receive the wireless signal, they can be used to steer the directional antenna. As described above, the directional antenna may comprise a high-gain directional antenna.

At block 1308, the directional antenna—in this embodiment, a high-gain directional antenna—may seek the wireless signal within the beam-width of the fixed antenna that received the wireless signal with the highest robustness. The high-gain directional antenna may have a narrower beam width than the determined fixed antenna. Thus, the high-gain directional antenna may not be able to receive signals over an azimuth similar to the determined fixed antenna.

To promote accurate signal reception, the high-gain directional antenna may seek the wireless signal or perform dithering to point in the direction which receives the wireless signal with the most robustness. The robustness of the signal received at the high-gain directional antenna may be determined as explained above in reference to block 1304. In addition to or in alternative to performing the robustness determination described above on the wireless signal received at the high-gain directional antenna, the robustness of the wireless signal received at fixed antennas surrounding the determined fixed antenna may be determined to estimate the direction in which the high-gain directional antenna should rotate. The high-gain directional antenna may continually seek the wireless signal.

The method 1300 may be automated such that little or no input is required by a user or operator of the receive site system. For example, the controller 1206 illustrated in FIG. 12, or other computer or automation device, may be used to automate the method 1300. The process 1300 may thus increase the speed and accuracy at which a signal may be tracked. To add to this, the reception of a signal with the fixed antennas while the directional antenna is being moved may reduce the need for dithering. A wireless signal may be properly received even if the steerable antenna is out of position or is in the process of moving. Of course, a user may also manually steer or rotate the directional antenna.

Figure 14:
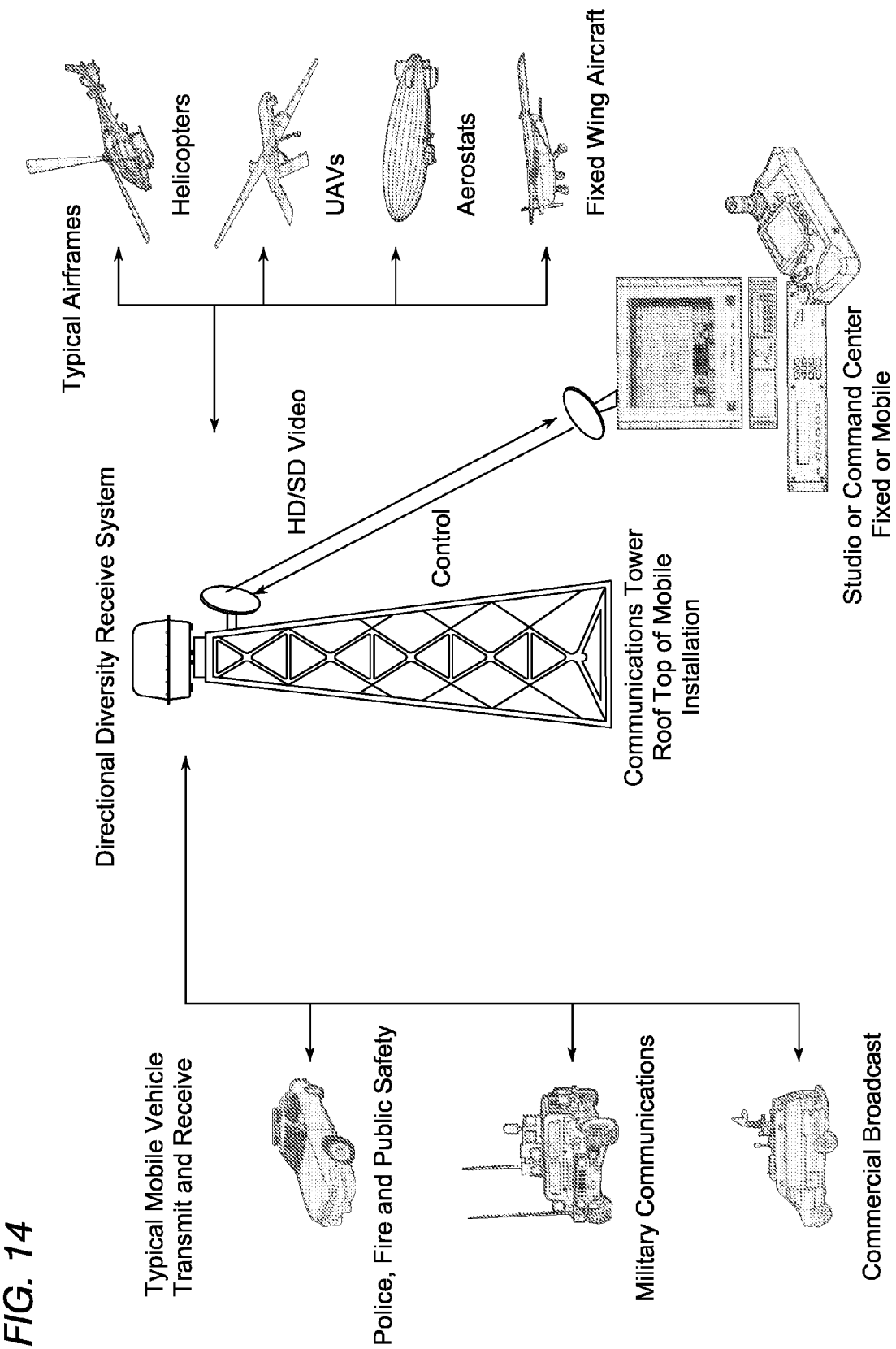
FIG. 14 is an illustration showing different situations in which the directional receive system of FIG. 1 may be utilized.

FIG. 14 is an illustration showing different situations in which the directional receive system of FIG. 1 may be utilized. In the illustrated embodiment, a directional diversity receive system is shown as being implemented on top of a communications tower. This receive system may comprise the system 100 or the system 200. The receive system may also be mounted on a building or other structure, or may be mounted on a moving receiver. The receive system may receive data from any number of sources, including automobiles such as police, fire and public safety vehicles; military and reconnaissance vehicles; and broadcast or telecommunications vehicles. The receive system may also receive data from aircraft such as helicopters, unmanned aerial vehicles (UAVs), aerostats or blimps, and fixed wing airplanes. The receive system may also receive control signals via a wired or wireless link, for example from a command center that is either automated or controlled by a user. Those of skill in the art will recognize other sources that may transmit data to the receive system.

In addition, a directional diversity receive system may be mounted on one or more mobile vehicles. For example, the receive system may be mounted on a news van and configured to receive signals from a tower or news station. In such embodiment, the system 200 may be advantageously utilized because of its relatively reduced size. The use of a directional diversity receive system as described herein may allow proper reception of signals even when the signal source is moving, such as when the signal is being transmitted from a mobile vehicle, or even when the receive system is moving, such as when the receive system is mounted on a mobile vehicle.

Those of skill in the art will appreciate that receive systems described herein may advantageously be used in environments where multi-path interference is high. Fixed antennas may receive signals from all directions, and the use of data selection methods such as MRC may allow data received at any antenna to be utilized. A directional antenna may be steered to pick up signals from a greater distance. Even when the directional antenna experiences interference due to multi-path, however, it is likely that one or more of the fixed antennas will receive and be able to demodulate a desired signal. Such environment is often experienced in urban settings where a transmitted signal reflects off of many buildings and other structures.

Embodiments disclosed herein may allow the addition of more receivers, demodulators, and/or antennas into a receive system. Thus, the receive system may avoid signal propagation and reception issues by using diversity, while reducing overall cost of the system and increasing ease of use. The receive system may be operated to automatically track a signal to ensure that the signal is received with the highest possible robustness. In this way, the input and sophistication required of a user is reduced.

The structure and the operation of the disclosed system and methods are not limited to the above descriptions. Various modifications may be made without departing from the spirit and scope of the present invention. While the above description has shown, described, and pointed out novel features of the system and methods as applied to various embodiments, it will be understood that various omissions, substitutions, and changes in the form and details illustrated may be made by those skilled in the art without departing from the spirit of the invention.

What is claimed is:

1. A system for receiving wireless signals, comprising:
a frame;
a plurality of fixed antenna attached to the frame, the plurality of fixed antennas being arranged to provide spatial diversity when receiving a wireless signal; and
at least one steerable antenna for receiving the wireless signal, the steerable antenna being attached to and moveable with respect to the frame,
wherein the at least one steerable antenna comprises at least one of a parabolic antenna or a yagi antenna, and
wherein the at least one steerable antenna is configured to be steered in a direction approximately aligned with a receiving direction of the fixed antenna receiving the wireless signal with the most robustness.

2. The system of claim 1, wherein the steerable antenna comprises a directional high gain antenna.

3. The system of claim 1, wherein the steerable antenna is configured to rotate independent of the plurality of fixed antennas.

4. The system of claim 1, wherein the frame and attached antennas are configured for relocation as an integrated module.

5. The system of claim 4, wherein the system is encapsulated by one or more covers.

6. The system of claim 1, wherein the plurality of fixed antennas are configured to receive the wireless signal from any direction within a 360 degree azimuth.

7. The system of claim 6, wherein the plurality of fixed antennas are arranged to define a circumference, and are configured to receive signals at least from a direction opposite that of an area within the circumference.

8. The system of claim 7, wherein the plurality of fixed antennas are approximately uniformly spaced about the circumference.

9. The system of claim 7, wherein the steerable antenna is located in an area within the circumference.

10. The system of claim 6, wherein the plurality of fixed antennas comprise at least three antennas.

11. The system of claim 6, consisting essentially of five fixed antennas and one steerable antenna.

12. The system of claim 1, wherein at least one of the plurality of fixed antennas is configured to detach from the frame, the at least one antenna being configured to receive the wireless signal when detached.

13. The system of claim 1, wherein at least one of the plurality of fixed antennas comprises an aluminum panel.

14. The system of claim 1, wherein at least one of the plurality of fixed antennas comprises a surface coated with a metal.

15. The system of claim 1, wherein a gain of each of the plurality of fixed antennas is approximately equal.

16. The system of claim 15, wherein the gain of each of the plurality of fixed antennas is approximately 8 dBi to approximately 12 dBi, and wherein a gain of the steerable antenna is approximately 20 dBi to approximately 26 dBi.

17. The system of claim 15, wherein the gain of each of the plurality of fixed antennas is approximately 8 dBi, and wherein a gain of the steerable antenna is approximately 16 dBi.

18. The system of claim 1, further comprising a plurality of demodulators, each demodulator being connected to a respective one of the plurality of fixed antennas and the steerable antenna.

19. The system of claim 18, further comprising an output configured to output data from all of the demodulators in a single stream.

20. The system of claim 1, wherein the system is configured to wirelessly receive digital video data.

21. The system of claim 1, wherein the steerable antenna has a gain larger than a gain of any of the plurality of fixed antennas, and wherein the plurality of fixed antennas and the steerable antenna are configured for relocation as an integrated module.

22. The system of claim 21, wherein the plurality of fixed antennas are arranged in a substantially pentagonal configuration about the steerable antenna.

23. The system of claim 21, wherein each of the plurality of fixed antennas comprises a sector antenna.

24. A method of receiving wireless signals using an antenna system, comprising:
  receiving a wireless signal at a plurality of fixed antennas attached to a frame of the antenna system, the plurality of fixed antennas being arranged to provide spatial diversity when receiving the wireless signal;
  steering at least one steerable antenna in a direction approximately aligned with a receiving direction of the fixed antenna receiving the wireless signal with the most robustness, the steerable antenna being attached to and moveable with respect to the frame;
  receiving the wireless signal at the steerable antenna,
  wherein the at least one steerable antenna comprises at least one of a parabolic antenna or a yagi antenna.

25. The method of claim 24, wherein at least one of the plurality of fixed antennas comprises an aluminum panel.

26. The method of claim 24, wherein at least one of the plurality of fixed antennas comprises a surface coated with a metal.

27. The method of claim 24, wherein the steerable antenna has a gain larger than a gain of any of the plurality of fixed antennas, and wherein the plurality of fixed antennas and the steerable antenna are configured for relocation as an integrated module.

28. The system of claim 24, wherein each of the plurality of fixed antennas comprises a sector antenna.

* * * * *